(12) United States Patent  
Rydin et al.

(10) Patent No.: US 8,916,073 B2  
(45) Date of Patent: Dec. 23, 2014

(54) METHOD OF MAKING A NATURAL RUBBER VACUUM BAG BY SPRAY PROCESSES, NATURAL RUBBER VACUUM BAG MADE USING SPRAY PROCESS, AND METHOD FOR USING NATURAL RUBBER BAG MADE USING SPRAY PROCESS

(76) Inventors: Richard W. Rydin, Chapel Hill, NC (US); Robert J. Scrima, Jr., Henderson, NV (US)

( * ) Notice: Subject to any disclaimer, the term of this patent is extended or adjusted under 35 U.S.C. 154(b) by 0 days.

(21) Appl. No.: 12/036,642

(22) Filed: Feb. 25, 2008

(65) Prior Publication Data

US 2008/0211130 A1 Sep. 4, 2008

Related U.S. Application Data

(60) Provisional application No. 60/903,056, filed on Feb. 23, 2007, provisional application No. 60/918,708, filed on Mar. 19, 2007.

(51) Int. Cl.
| | |
|---|---|
| *B29C 33/40* | (2006.01) |
| *B29C 43/36* | (2006.01) |
| *B29C 41/08* | (2006.01) |
| *B29C 33/00* | (2006.01) |

(52) U.S. Cl.
CPC ............ *B29C 43/3642* (2013.01); *B29C 41/08* (2013.01); *B29C 33/00* (2013.01); *B29C 2043/3644* (2013.01); *B29K 2995/0026* (2013.01)
USPC ........... 264/219; 264/510; 264/136; 264/257; 264/511; 264/220; 264/299; 264/309; 425/389

(58) Field of Classification Search
USPC ......... 264/510, 136, 257, 258, 511, 571, 219, 264/220, 299, 241, 309; 425/389, 405.1, 425/111, 112; 156/245, 285, 286; 427/421.1, 294
See application file for complete search history.

(56) References Cited

U.S. PATENT DOCUMENTS

| | | | |
|---|---|---|---|
| 2,913,036 A | 11/1959 | Smith | |
| 4,125,526 A | 11/1978 | McCready | |

(Continued)

FOREIGN PATENT DOCUMENTS

| | | |
|---|---|---|
| AU | 2008218935 | 7/2012 |
| CN | 1 946 541 A | 4/2007 |

(Continued)

OTHER PUBLICATIONS

SR Composites, LLC.; SR Composites.com.*

(Continued)

*Primary Examiner* — Amjad Abraham  
*Assistant Examiner* — Ninh Le  
(74) *Attorney, Agent, or Firm* — James Creighton Wray

(57) ABSTRACT

Disclosed is a method for making a membrane for use as a vacuum bag, a natural rubber vacuum bag made using such methods, and methods for using such a natural rubber bag to form a composite article. One method can include providing a substantially non-porous working surface having a desired shape for forming a vacuum bag, spraying at least one layer of a natural rubber liquid over at least a portion of working surface, and solidifying the natural rubber liquid to form a membrane having a shape substantially corresponding to that of the working surface. The membrane formed being elastically deformable and substantially impermeable for functioning as a vacuum bag in Vacuum Assisted Resin Transfer Molding, debulking, compaction, or similar processes.

15 Claims, 10 Drawing Sheets

(56) References Cited

U.S. PATENT DOCUMENTS

| | | | |
|---|---|---|---|
| 4,287,015 A | | 9/1981 | Danner, Jr. |
| 4,312,829 A | | 1/1982 | Fourcher |
| 4,369,117 A | * | 1/1983 | White .......................... 210/782 |
| 4,622,091 A | * | 11/1986 | Letterman .................... 156/286 |
| 4,681,651 A | | 7/1987 | Brozovic et al. |
| 4,702,376 A | * | 10/1987 | Pagliaro .................... 206/524.8 |
| 4,822,436 A | | 4/1989 | Callis et al. |
| 4,842,670 A | | 6/1989 | Callis et al. |
| 4,902,215 A | | 2/1990 | Seemann, III |
| 4,942,013 A | | 7/1990 | Palmer et al. |
| 4,985,279 A | | 1/1991 | Mussallem, III |
| 5,129,813 A | | 7/1992 | Shepherd |
| 5,316,462 A | | 5/1994 | Seemann |
| 5,318,422 A | | 6/1994 | Erland |
| 5,370,598 A | | 12/1994 | Corneau, Jr. |
| 5,439,635 A | | 8/1995 | Seemann |
| 5,549,567 A | * | 8/1996 | Wolman ........................ 604/179 |
| 5,601,852 A | | 2/1997 | Seemann |
| 5,624,512 A | * | 4/1997 | Boszor ............................ 156/87 |
| 5,665,301 A | | 9/1997 | Alanko |
| 5,702,663 A | | 12/1997 | Seemann |
| 5,716,488 A | | 2/1998 | Bryant |
| 5,807,593 A | * | 9/1998 | Thompson .................... 425/389 |
| 5,882,340 A | * | 3/1999 | Yoon ........................ 604/164.12 |
| 6,086,813 A | | 7/2000 | Gruenwald |
| 6,406,659 B1 | | 6/2002 | Lang et al. |
| 6,578,709 B1 | * | 6/2003 | Kavanagh et al. ............ 206/364 |
| 6,630,095 B2 | | 10/2003 | Slaughter et al. |
| 6,723,273 B2 | | 4/2004 | Johnson et al. |
| 6,811,842 B1 | | 11/2004 | Ehrnsperger et al. |
| 6,816,042 B1 | * | 11/2004 | Noyes et al. .................. 333/248 |
| 6,851,945 B2 | | 2/2005 | Potter et al. |
| 6,869,561 B2 | | 3/2005 | Johnson et al. |
| 7,014,809 B2 | | 3/2006 | Audette |
| 7,029,267 B2 | | 4/2006 | Caron |
| 7,160,498 B2 | | 1/2007 | Mataya |
| 7,413,694 B2 | | 8/2008 | Waldrop, III et al. |
| 7,662,334 B2 | | 2/2010 | Miller et al. |
| 2005/0086916 A1 | | 4/2005 | Caron |
| 2005/0183818 A1 | | 8/2005 | Zenkner et al. |
| 2005/0184432 A1 | | 8/2005 | Mead |
| 2005/0202156 A1 | * | 9/2005 | O'Connor et al. ............. 427/2.1 |
| 2005/0261422 A1 | * | 11/2005 | Ton-That et al. .............. 524/599 |
| 2006/0113714 A1 | * | 6/2006 | Giloh et al. ................... 264/517 |
| 2007/0164479 A1 | | 7/2007 | Lopez |
| 2008/0048369 A1 | | 2/2008 | Kulesha |
| 2008/0220112 A1 | | 9/2008 | Waldrop et al. |
| 2008/0308960 A1 | | 12/2008 | Rydin et al. |

FOREIGN PATENT DOCUMENTS

| | | |
|---|---|---|
| WO | WO 2008/103485 A1 | 8/2008 |
| WO | WO 2008/144035 A1 | 11/2008 |

OTHER PUBLICATIONS

Professional Boatbuilder; Feb./Mar. 2009; http://www.proboat-digital.com/proboat/e20090203/?pg=12; p. 10-11.*

Erik Lokensgard; Industrial Plastics Theory and Applications; 2003; Thomson Delmar Learning; Fourth Edition; p. 228-229.*

D.C. Blackley; Polymer Lattices:Application of Latices; 1997; Springer; $2^{nd}$ Edition; p. 83.*

SR Composites, LLC.; 2007; SR Composites.com.*

Notification of Trasmittal of the International Search Report and the Written Opinion of the International Searching Authority, or the Declaration for International Application No. PCT/US08/02427 (Jun. 11, 2008).

Commonly-assigned, co-pending U.S. Appl. No. 12/123,216 for "Vacuum Bag with Integral Fluid Transfer Conduits and Seals for Resin Transfer and Other Processes," (Unpublished, filed May 19, 2008).

Notification of Transmittal of the International Search Report and the Written Opinion of the International Searching Authority, or the Declaration for International Application No. PCT/US08/06392 (Aug. 8, 2008).

Office Action for Australian Patent Application No. 2008218935(Jul. 20, 2010).

Final Official Action for U.S. Appl. No. 12/123,216 (Oct. 18, 2011).

Official Action for Canadian Patent Application No. 2,679,111 (Aug. 15, 2011).

Non-Final Official Action for U.S. Appl. No. 12/123,216 (Feb. 1, 2011).

Restriction Requirement for U.S. Appl. No. 12/123,216 (Dec. 9, 2010).

Notice of Allowance for Canadian Patent Application No. 2,679,111 (May 22, 2012).

Notice of Acceptance of Application for Austrailian Patent Application No. 2008218935 (Mar. 20, 2012).

First Office Action for Chinese Patent Application No. 200880012596.X (Mar. 23, 2012).

Interview Summary for U.S. Appl. No. 12/123,216 (Jan. 31, 2012).

First Office Action for Chinese Patent Application No. 200880025122.9 (Aug. 23, 2012).

* cited by examiner

METHOD OF MAKING A NATURAL RUBBER VACUUM BAG BY SPRAY PROCESSES, NATURAL RUBBER VACUUM BAG MADE USING SPRAY PROCESS, AND METHOD FOR USING NATURAL RUBBER BAG MADE USING SPRAY PROCESS

RELATED APPLICATIONS

This application claims the benefit of U.S. Provisional Patent Application Ser. No. 60/903,056, filed Feb. 23, 2007; the disclosure of which is incorporated herein by reference in its entirety. This application further claims the benefit of U.S. Provisional Patent Application Ser. No. 60/918,708, filed Mar. 19, 2007.

TECHNICAL FIELD

The subject matter described herein relates generally to the field of vacuum bag construction. More particularly, the subject matter described herein relates to methods for making a natural rubber vacuum bag operable for use in vacuum-assisted resin transfer molding, debulking, compaction, or similar processes, a natural rubber vacuum bag made by spray processes, and a method for using a natural rubber vacuum bag made by spray processes.

BACKGROUND

Composites are defined broadly as the combination of two or more dissimilar materials to produce a new material that has synergistic properties that were not present in the individual constituents alone. In practical terms, the word composite is generally associated with reinforced plastic material such as fiberglass structures. In the case of fiberglass, beneficial synergistic properties including corrosion resistance, low weight, high strength, and low cost are attainable in a highly variable array of product geometries.

Fabrication of a composite article such as a fiberglass boat hull requires the combination of a solidifiable resin system with a "preform" that could include glass fibers, veils, flow media and cores. There are many processes available for the purpose of impregnating a preform with liquid resin in order to make a composite. These processes may be broadly characterized into two categories, wet lay-up "open molding" and resin infusion "closed molding."

Open molding processes tend to produce a final component having a low fiber volume fraction (i.e., lower relative amount of fiber compared to the amount of resin). They are also labor intensive to manufacture because each layer of preform material must be individually coated with resin and carefully positioned by hand. Further, the inherent nature of open molding processes can allow air bubble entrapment to occur inside the composite, and the completed part can have a non-uniform thickness and fiber volume fraction.

In addition, open molding often leads to direct worker exposure to Volatile Organic Compounds (VOC) and Hazardous Airborne Pollutants (HAP). Both VOC and HAP are recognized by the EPA as potential health hazards for which alternative control technologies should be sought. As a result, although exceptions can be found, these deficiencies generally result in articles formed by open molding techniques being disfavored where other methods are available.

By comparison, closed molding—and more particularly resin transfer molding (RTM)—overcomes many of the limitations of wet lay-up processes. RTM involves a preform being constrained under pressure within a mold cavity whereupon resin is forced into the open spaces remaining. Resin infusion methods limit exposure to VOC and HAP and allow for better control over part dimensions and fiber volume fraction. RTM molds are typically made from matched steel mold platens which are supported in a hydraulic press due to the high injection pressures required to force resin through a highly compacted preform. The escalating cost of fabricating rigid molds for parts in excess of about 100 square feet tends to limit the size of parts considered for RTM.

Vacuum Assisted Resin Transfer Molding (VARTM) is a variation of RTM that achieves preform compaction by removing air located between a single sided rigid tool and a flexible vacuum bag that encapsulates a preform placed on the tool. Tooling costs are significantly reduced because there is only one tool surface and atmospheric pressure replaces the hydraulic press. VARTM provides a closed mold solution for complex and/or large parts that were previously not considered infusable. A desirable element of a VARTM mold is a vacuum bag that has sufficient elasticity to accommodate the strains associated with preform compaction as air is removed. It is further desirable for the vacuum bag to be sufficiently impermeable so that air does not leak through the bag and adversely affect the flow of resin or leave air pockets within the composite product. A vacuum bag should also provide a sufficiently snug fit around a preform to prevent the formation of creases and/or bridges which can become resin runners leading to inconsistent flow fronts.

The most common vacuum bag currently used for VARTM is a single-use Nylon film, and variations are available with more or less stretch, heat resistance, tear strength and thickness. Films are sold in flat sheet stock requiring fabricators to cut, paste and seam sections together as needed to build a suitable vacuum bag. While suppliers are now offering the convenience of thermally seamed near net shape film bags, Nylon films are not reusable and thus end up in the dump after each mold run. Furthermore, disposable bags of this kind rarely provide sufficient elasticity to eliminate bag bridging and or bulging which can lead to inconsistent infusions and dry spots in the molded composite article.

The composites industry is beginning to recognize that reusable vacuum bags are a desirable component of economically viable production closed molding programs, with bag longevity being a key factor. Reusable bags must withstand significantly more wear and abuse than disposable bags. A variety of Synthetic rubbers have been used to make reusable vacuum bags, including calendared rubber sheets of EPDM, Silicone, butyl, fluoroelastomers, nitriles and polyisoprenes and room temperature vulcanizing (RTV) silicones, all of which originate from a petroleum feed stock.

For reasons of transparency and the ability to make near net shape constructions, RTV silicone systems have become the material of choice for making reusable vacuum bags. Vacuum bags made from calendared silicone sheets require seam treatments of either RTV silicone or a beta staged silicone material that must be subsequently cured with heat and moisture. Reusable bags are also made from semi-cured silicone sheet stock that is cut into desired shapes, draped in place on the mold surface upon which the seams are troweled over to create low profile joints. Another method involves spreading an uncured thixotropic RTV silicone liquid uniformly over a mold surface prior to curing it. In all of these instances, the procedure for building a reusable silicone vacuum bag is tedious and requires skilled labor.

Silicones have poor puncture and tear resistance, however, and therefore must be reinforced or thickened for durability, which makes them susceptible to the bridging effect in addition to being unnecessarily heavy and cumbersome to manipulate. For very large parts such as boat hulls, bridge decks, and wind blades, the weight of a given bag can become a significant issue. Large bags often need to be lifted mechanically and therefore require lift points. Bag strength becomes a critical factor because thicker bags weigh more and droopy bags can get caught on foreign objects and become damaged.

Attempts have been made to spray silicone rubbers with mixed results. Typical RTV silicones have high viscosity and are thixotropic which makes them difficult to spray because the material does not flow easily. It is thus difficult to achieve uniform bag thicknesses over large areas because the product must be toweled out after being applied to the surface. It is possible to reduce the viscosity of RTV silicones with the addition of solvents, but this remedy has the potential to become a source of VOC and HAP. Spray equipment that atomizes the silicone also runs the risk of contaminating the surfaces of neighboring articles exposed to the overspray and can become a major problem for adhesive bonding and/or painting operations carried out in the vicinity.

In light of the factors that should be considered when fabricating a composite article, there still exists a need for a durable, reusable vacuum bag for use in closed molding and vacuum bagging applications that limits the production of VOC and HAP and minimizes the overall environmental impact.

SUMMARY

The subject matter described herein includes methods for making a natural rubber vacuum bag operable for use in closed molding and other vacuum bagging applications, a natural rubber vacuum bag made using such methods, and methods for using such a natural rubber bag to form a composite article.

According to one aspect, the subject matter disclosed herein includes a method of making a membrane for use as a vacuum bag, including providing a substantially non-porous working surface having a desired shape for forming a vacuum bag, spraying at least one layer of a natural rubber liquid over at least a portion of working surface, and solidifying the natural rubber liquid to form a membrane having a shape substantially corresponding to that of working surface. By this method, the membrane formed is near net shape, elastically deformable and substantially impermeable and is thus operable for functioning as a vacuum bag.

According to another aspect, the subject matter disclosed herein includes a method for using a vacuum bag to compact a preform. In this aspect, the method includes providing a substantially non-porous working surface having a desired shape of a vacuum bag, spraying at least one layer of a natural rubber liquid over working surface, and solidifying the natural rubber liquid to form a membrane. Accordingly, the membrane formed is elastically deformable and substantially impermeable. Further, the method includes providing a substantially non-deformable base surface having a desired shape of a compacted preform, sealing a preform between the base surface and the membrane, and removing air from between the base surface and the membrane to draw together the base surface, the preform, and the membrane. As a result, the preform conforms substantially to the desired shape of the compacted preform. The method can further include infusing the preform with resin and solidifying the resin to create a composite article.

According to yet another aspect, the subject matter disclosed herein includes a method for making a composite article, including sealing a spray-formed natural rubber membrane to a mold having a desired shape for making a composite article, evacuating air from a region defined by the membrane and a preform, flowing a solidifiable resin in the region, and solidifying the resin to form the composite article.

BRIEF DESCRIPTION OF THE DRAWINGS

Embodiments of the subject matter described herein will now be explained with reference to the accompanying drawings, of which.

DETAILED DESCRIPTION

Reference will now be made in detail to possible embodiments of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

Figure 1:
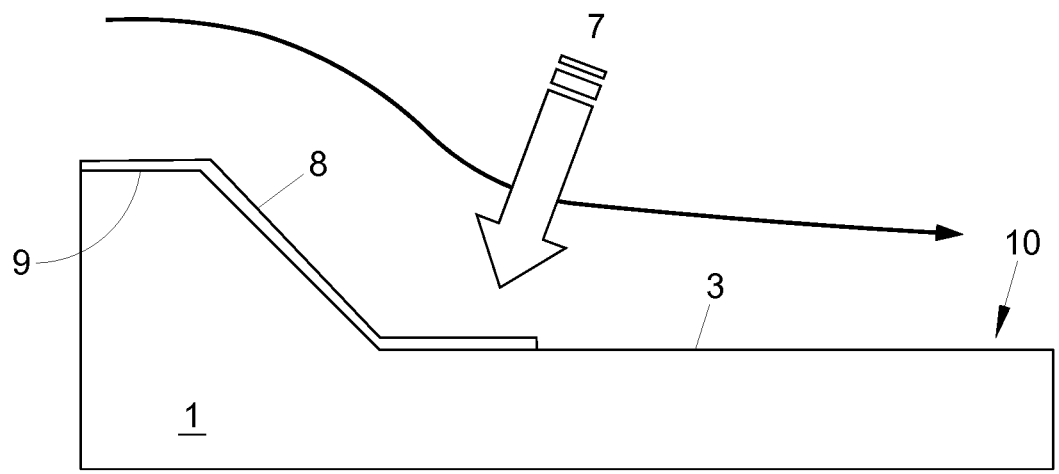
FIG. 1 illustrates an arrangement for performing the method of making a natural rubber vacuum bag by spray processes according to an embodiment of the present subject matter.

According to one embodiment, the present subject matter provides a method of making a membrane for use as a vacuum bag. As is depicted in FIG. 1, the method includes providing a substantially non-porous working surface 10, which in this illustration coincides with a mold surface 3 of a mold 1, such surfaces generally being smooth and non porous in nature. Working surface 10 defines the size and shape of a vacuum bag membrane 20 formed thereon when a liquid natural rubber 7 is sprayed on working surface 10 leaving a liquid natural rubber layer 8 which dries to form natural rubber vacuum bag membrane 20. Correct sizing of vacuum bag membrane 20 helps to eliminate bridging, where the bag material does not completely conform to concave mold transitions, and creasing, where excess bag material folds over on itself to form an undesirable cavity. In the context of resin transfer molding of composite articles, each of these fitting problems can lead to non-uniform fiber volume fractions, higher resin usage, heavier parts, and loss of control over resin flow fronts during infusion.

Figure 2:
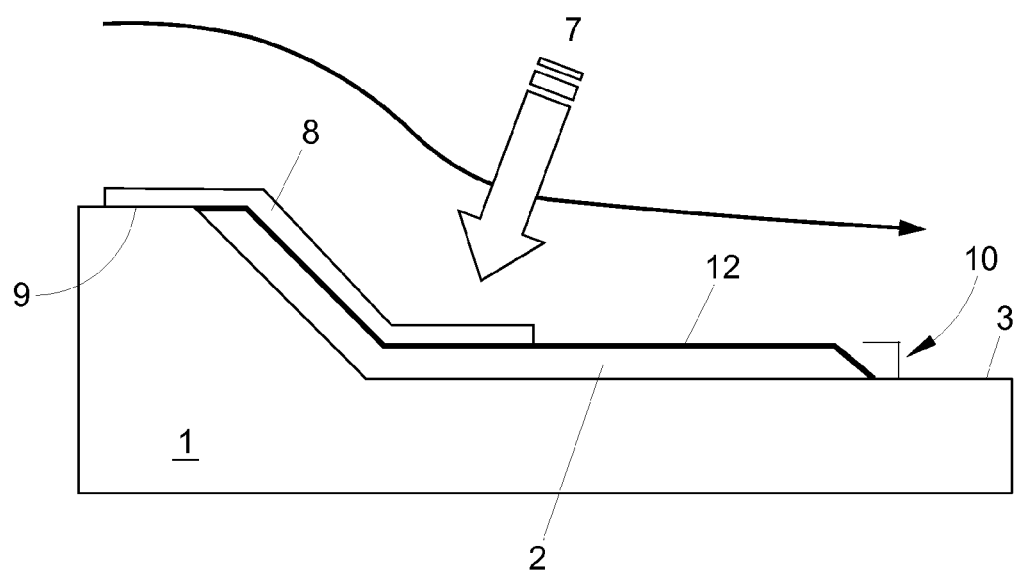
FIG. 2 illustrates an arrangement for performing the method of making a natural rubber vacuum bag by spray processes according to another embodiment of the present subject matter.

FIG. 2 illustrates a method of ensuring that the completed vacuum bag membrane 20 is properly sized for its intended use. In this alternative, working surface 10 is formed by first placing a working surface template 2 on a mold 1, a surface of working surface template 2 having substantially the exact shape desired for vacuum bag membrane 20. Working surface template 2 can be an actual part or a replica of the part that will be molded using vacuum bag membrane 20 on mold 1. When the surface of working surface template 2 is porous or cannot readily be made smooth it is difficult to apply liquid natural rubber 7 in uniform layers using a spray process. Therefore, working surface 10 can be made substantially smooth and non porous by covering up the defective working surface with a thin flexible film 12. Suitable films can include thin silicone sheet, urethane film, high elongation nylon film and a thin natural rubber sheet produced according to the presently disclosed method. Flexible film 12 can be sealed around its perimeter using perimeter seals 13 located on a mold flange 9 or in another suitable location on mold 1. A buffer layer 11 can be placed on the defective working surface and underneath flexible film 12. The buffer layer 11 can be, for instance, a thin flexible blanket that is sufficiently permeable to serve as a breather when placed under flexible film 12 such that flexible film 12 can be drawn tightly over working surface template 2 by removing air from of the cavity formed between mold 1 and flexible film 12.

Regardless of which method is used to form working surface 10, it is further provided that working surface 10 should be substantially non-porous and generally smooth. Any roughness or surface features on working surface 10 can transfer to the surface of vacuum bag membrane 20, which can then transfer ad infinitum to every subsequent part molded with vacuum bag membrane 20.

Another means of providing a substantially non-porous working surface 10 is to spray or brush a tooling gelcoat or surface primer such as Duratec High Gloss on working surface template 2. It is helpful if the gelcoat or primer material is self leveling and fast drying. Alternatively, if a thicker layer is required, it is possible to first spray a foam layer down and then apply a gelcoat or primer layer to seal the pores and provide a smooth working surface 10.

Once working surface 10 is prepared, the method can further include spraying at least one layer of a natural rubber liquid 7 over at least a portion of working surface 10. Natural rubber is not considered a toxic material and it can be cleaned up with distilled water, resulting in a more advanced "green technology" than the current art for applying other elastomers (e.g., silicone) to construct mold bags or films. Natural rubber is quite distinct from synthetic rubber in that it originates from the sap of various trees. The Hevea tree provides a cis-1,4-polyisoprene variety while the Gutta-percha and Balata trees provide a trans isomer of polyisoprene. The two types of raw natural rubber, field latex and raw coagulum, comprise substantially all natural rubber downstream grades. Most natural rubber applications require cross-linking via vulcanization with sulfur to increase resiliency and strength. This treatment is well-known to those having skill in the relevant art.

Although synthetic rubbers tend to have better resistance to aromatic and chlorinated solvents, natural rubber resists being dissolved by virtue of its high Molecular Weight (MW), which can be reduced by milling. Synthetic rubbers also tend to harden over time, whereas natural rubbers tend to soften. In this way, natural rubber vacuum bags maintain sufficient flexibility to work effectively, which provides for better longevity.

Natural rubber generally has good resilience, high tensile strength, low compression set, and resistance to wear, tear, cut-through, and cold flow. Each of these properties is desirable to different extents in a reusable vacuum bag and can be tailored based on individual fabricator needs by compounding natural rubber with various enhancing agents. For example, natural rubbers used in other applications are frequently compounded with waxes to improve resistance to UV, oxygen and ozone, but such compounding often has the counter-effect of softening the natural rubber. As a result, if such compounding is not performed, it is recommended to keep natural rubber vacuum bags out of direct sunlight.

Tensile strength and abrasion resistance of natural rubbers are typically increased by adding carbon black, precipitated pigments, organic vulcanization accelerators, Baryates, talc, silica, silicates, clays and fibrous materials. Among these additives, talc, silica and clays are particularly suitable for a natural rubber vacuum bag that is to be sprayed because fibers typically interfere with spray equipment and carbon black also pigments the material which results in a loss of transparency. Since vacuum bags are stretched during use and are generally exposed to abrasion and abuse, it is desirable to modify the natural rubber accordingly for longer bag life. For example, using clay additives in a range between about 5 and 35% with appropriate wetting agents can provide a natural rubber having high strength and heat resistance.

These same additives that tend to improve tensile strength and abrasion resistance also tend to improve resistance to heat. Vacuum bags used to infuse solidifiable resin systems into a preform often see elevated temperatures when the resin cures due to the heat of exotherm. Some resin systems have higher exotherms than others so resistance to heat might be a more important consideration than transparency or percent strain to failure. The effect of silica additives is to increase the viscosity which helps liquid natural rubber to stick when sprayed on a vertically oriented working surface.

In addition, coloring agents including iron oxides, titanium oxides, chromium oxides, and organic pigments can be added. The use of such coloring agents should be limited, however, where there is a desire to see through a vacuum bag during its use.

Further, surfactants can also be added to remove excess air bubbles that can cause porosity in vacuum bag membrane 20. A natural rubber material modified by the addition of enhancing agents can also be filtered to remove large clumps of additives that can interfere with spraying. For example, the material can be filtered through 100 mesh screens. Examples of commercially available natural rubber materials suitable for use with embodiments of the subject matter described herein are Sprayomer™ elastomers currently available from SR Composites, LLC of Henderson, Nev.

Figure 3:
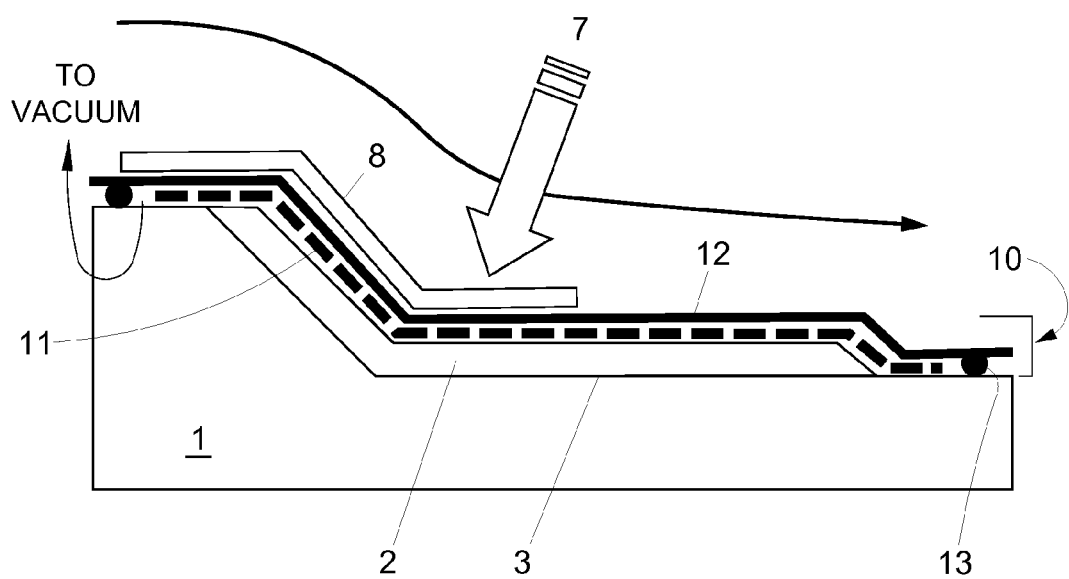
FIG. 3 illustrates an arrangement for performing the method of making a natural rubber vacuum bag by spray processes according to yet another embodiment of the present subject matter.

Referring again to FIGS. 1-3, vacuum bag membrane 20 can be formed by spraying a liquid natural rubber 7 over at least a portion of working surface 10 using a spray applicator that uses minimal atomization air and pressure. For example, spray equipment that is suitable for applying a natural rubber applies the liquid to working surface 10 at fluid tip velocities less than 20 feet per second (e.g., 1-5 feet/sec.) and with gun tips larger than standard size 8. The use of such equipment results in high transfer efficiency for natural rubber, provides high quality smooth surfaces and a cleaner work environment. In contrast, typical gelcoat spray equipment that is often used in the composites industry applies material at tip velocities in excess of 20 feet per second. A natural rubber sprayed with a high tip velocity applicator may not readily transfer to working surface 10 with the liquid rubber effectively bouncing off the surface. Additionally, typical spray processes have high levels of overspray, which is costly and creates an emission problem when using polymer systems containing VOC or HAP.

The spraying process can involve spraying liquid natural rubber 7 in a direction generally perpendicular to working surface 10 as the sprayer is passed over working surface 10, as is shown by the arrow in FIGS. 1-4. Advantageously the spraying process can be substantially automated by using spray equipment controlled by electronic and/or mechanical systems to provide a consistent and repeatable application of the uncured elastomer, which can facilitate mass production of vacuum bag membrane 20 for use as a vacuum bag.

Situations can arise where spraying is difficult due physical constraints of working surface 10 such as blind areas, overhangs, deep wells that are too small for the sprayer to fit into, and sharp transitions. As a result it may be difficult to apply layers of liquid natural rubber 7 having a uniform thickness or smoothness on every section of working surface 10. In such situations, these incomplete sections of working surface 10 can be filled in by other methods, such as brushing, pouring, or casting the elastomeric material onto the incomplete sections of working surface 10.

Figure 4:
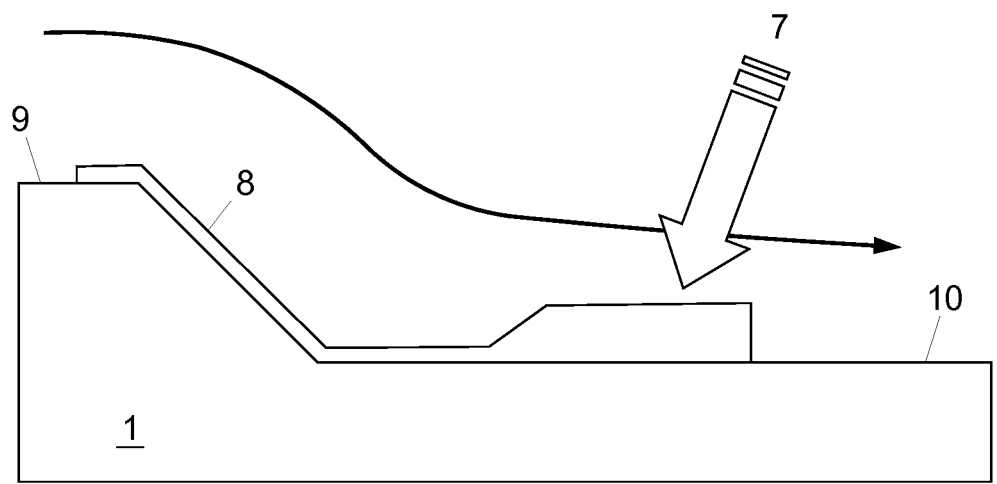
FIG. 4 illustrates an arrangement for performing the method of making a natural rubber vacuum bag by spray processes according to still another embodiment of the present subject matter.

In addition, as is shown in FIG. 4, the spraying can be performed non-uniformly across working surface 10 such that liquid natural rubber layer 8 has a variable thickness. Spraying thinner sections can produce more transparency in the completed vacuum bag membrane 20. Controlling the transparency to form windows in vacuum bag membrane 20 can thus allow the user to view the underlying preform 31, the infusing resin 35, or mold 1, for example, to align vacuum bag membrane 20. By way of further example, thicker sections can be incorporated into vacuum bag membrane 20 to increase the strength of vacuum bag membrane 20 in areas where stress, temperature, or mechanical abuse is likely to occur. Varying the thickness of sections of vacuum bag membrane 20 can also be desirable to correspondingly vary localized stretching of vacuum bag membrane 20 across its surface.

After the at least one layer of liquid natural rubber 8 is sprayed onto working surface 10, the layer or layers can be solidified to form a vacuum bag membrane 20 having a shape substantially corresponding to that of working surface 10. Solidifying liquid natural rubber layer 8 into a solid vacuum bag membrane 20 essentially involves a phase change wherein water is removed from liquid natural rubber layer 8 by evaporation. The rate of water evaporation from the liquid natural rubber is primarily determined by the ambient temperature and humidity level. It is therefore possible to speed up the phase change from liquid to solid by adding heat, lowering the relative humidity, increasing airflow over the surface, or by addressing a combination of these variables. A convection oven which circulates heated air is an ideal environment for speeding up the phase change. Because natural rubbers do not have a high resistance to UV it is not recommended to use sunlight as a heat source for more than short periods of time (e.g., hours) to assist the phase change.

Since the phase change from liquid to solid natural rubber involves the evaporation of water it can be expected that there will be a volumetric change associated with the phase change which is proportional to the percent solids present in the liquid. Liquid natural rubber layer 8 formed by spraying liquid natural rubber 7 onto working surface 10 has a certain wet film thickness depending on the spray pattern. As liquid natural rubber layer 8 dries it becomes thinner to accommodate the water lost to evaporation. Eventually liquid natural rubber layer 8 dries substantially to a dry thickness of vacuum bag membrane 20 and most of the volumetric change is accommodated by the film thickness change. At some point between being liquid natural rubber layer 8 and vacuum bag membrane 20, the natural rubber is no longer fluid enough accommodate all of the volumetric shrinkage through the thickness, but rather develops a residual in-plane tension within vacuum bag membrane 20. This in-plane tension manifests as an overall shrinkage of the bag relative to working surface 10 upon which the liquid natural rubber 7 was originally sprayed.

The tendency of liquid natural rubber layer 8 to shrink during the phase change to solid natural rubber can be used advantageously to ensure vacuum bag membrane 20 forms a smooth surface. By restraining the position of the perimeter of the natural rubber material as it solidifies, the tendency of the material to shrink as a result of the residual tension developed in the surface of vacuum bag membrane 20 is inhibited. The residual tension is thus usefully employed in that the pre-stretched membrane is less likely to develop creases or folds, which could develop when vacuum bag membrane 20 is oversized for a particular use. In addition, elastomeric materials can often stretch as the material ages. As a result, residual tension in vacuum bag membrane 20 can counteract this aging effect, thereby extending the useful life of vacuum bag membrane 20.

Of course, the benefits achieved with creation of residual tension must be balanced against the problem of the tendency of a highly strained elastomer sheet to thin out and become more permeable, which in turn increases the amount of volatiles that can diffuse through it and or become trapped within the material. As the concentration of foreign material builds up within an elastomer sheet it begins to lose its flexibility making it more susceptible to strain induced damage.

Based on these observations, it is noted that the useful life of vacuum bag membrane 20 can be dramatically increased by properly sizing working surface template 2 such that expected in-plane shrinkage is accommodated by making working surface 10 slightly larger or smaller than a preform 31 depending on whether mold 1 is a male or female type mold, respectively.

Figure 9:
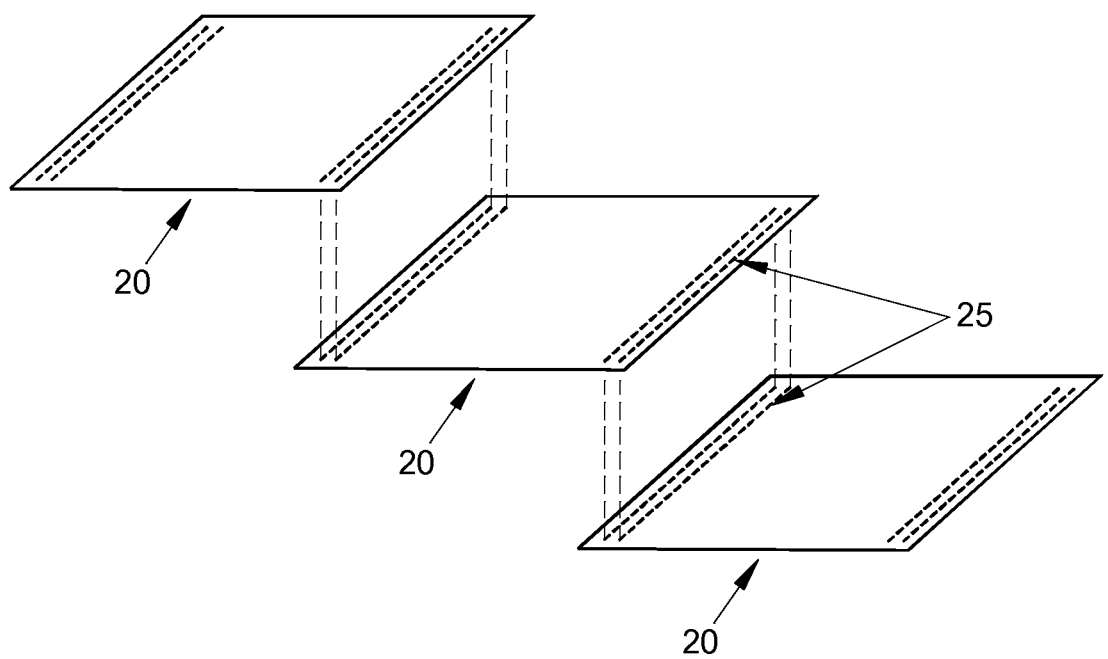
FIG. 9 illustrates the use of one or more surface features for the alignment of spray-formed vacuum bag sections according to an embodiment of the present subject matter.

The method disclosed hereinabove can thus be used to form a seamless membrane for use as a vacuum bag. Further, as is depicted in FIG. 9, the method can include arranging two or more sheets of material next to each other and spraying at least one layer of a natural rubber liquid in the gaps between the sheets. This alternative can be used to create extra-large vacuum bag membranes 20 either by joining multiple spray-formed membranes or simply connecting multiple sheets of an elastically deformable material.

Figure 5:
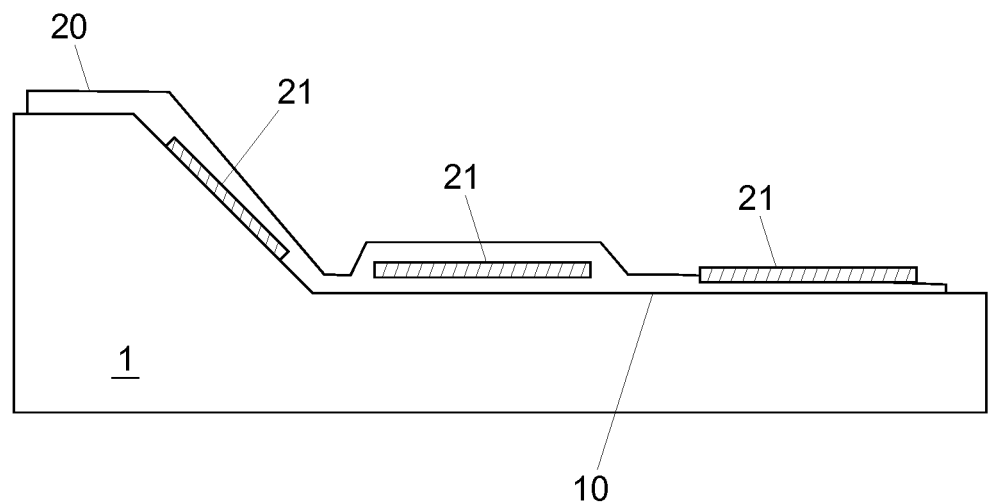
FIGS. 5 and 6 illustrate the incorporation of one or more articles in a spray-formed vacuum bag according to an embodiment of the present subject matter.
Figure 6:
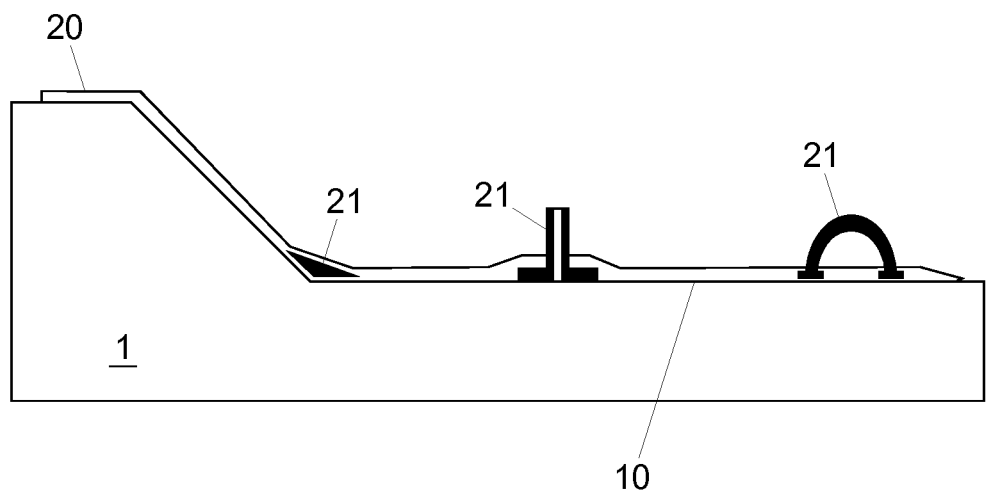

Referring to FIGS. 5 and 6, the method can further include incorporating one or more articles 21 into completed vacuum bag membrane 20. These articles 21 can be incorporated by placing articles 21 on working surface 10 prior to spraying liquid natural rubber 7 to form liquid natural rubber layer 8, thereby anchoring articles 21 to the functional surface of vacuum bag membrane 20. Alternatively, articles 21 can be positioned within liquid natural rubber layer 8 during spraying, embedding articles 21 within vacuum bag membrane 20. Further still, articles 21 can be positioned on liquid natural rubber layer 8 after spraying is complete, leaving articles 21 exposed.

For instance, one example of articles 21 can be a perimeter framework 22, which can be incorporated along the edge of vacuum bag membrane 20 to restrain the edge of the position of vacuum bag membrane 20 as it solidifies. As noted above, this restraint can result in residual tension developing in the surface of vacuum bag membrane 20, which can be useful in preventing creases from forming in vacuum bag membrane 20 during use as a vacuum bag. Other examples of articles 21 that could usefully be incorporated into vacuum bag membrane 20 in this manner include an internal framework, seals or portions of seals, attachments for lifting, ports, pressure intensifiers, pressure gauges, battens, thermocouples, actuators, sensors, RFID devices, and/or heating elements. Further examples of incorporated articles 21 can include discrete pieces of material such as rigid or flexible fiber-reinforced plastic (FRP), an elastomeric material, a calendared elastomeric sheet, an impermeable or semi-permeable membrane, a plastic sheet, a metal sheet, reinforcing fabrics and veils, a ceramic panel, and/or a wood panel.

Of course, some items that can be incorporated as articles 21 that can usefully be integrated with vacuum bag membrane 20 may not readily adhere to the natural rubber material. For certain items that can be incorporated as articles 21, such as a gauge or sensor embedded within vacuum bag membrane 20, this detachment may be acceptable. Allowing a temperature sensor to "float" within vacuum bag membrane 20 can be desirable because articles 21 incorporated in this way do not affect the ability of the vacuum bag to elastically deform in response to applied pressures. Other examples of articles 21 such as strain sensors, position indicators, and pressure intensifiers may need to be fixed securely to vacuum bag membrane 20. In these situations, a primer such as a methacrylate modified natural rubber can be applied to articles 21 to facilitate bonding of natural rubber layer 8 to articles 21. In this way, articles 21 that would not naturally adhere to natural rubber can be fixedly incorporated into vacuum bag membrane 20. Still other examples of articles 21, such as a reinforcing mesh embedded within liquid natural rubber layer 8, do not generally require a chemical surface primer due to the mechanical interlocking that takes place when the liquid natural rubber layer 8 dries to become vacuum bag membrane 20.

Figure 7:
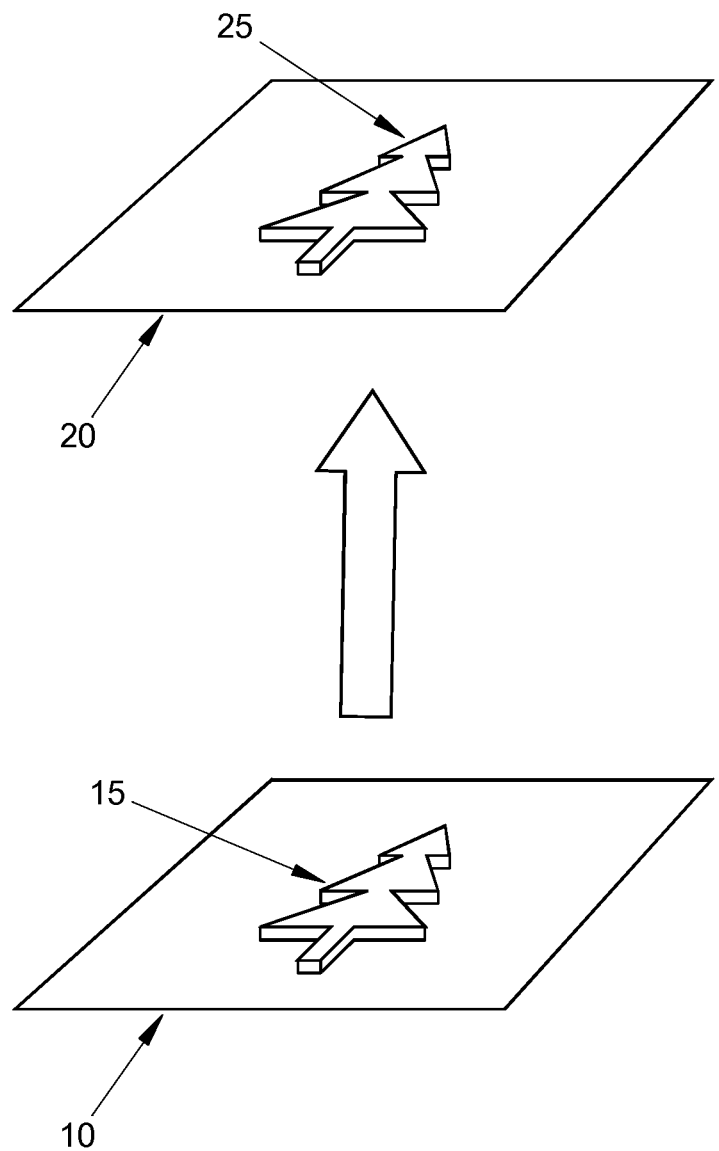
FIG. 7 illustrates the incorporation of one or more surface features in a spray-formed vacuum bag according to an embodiment of the present subject matter.

Referring to FIG. 7, another way to advantageously modify vacuum bag membrane 20 is to alter its surface finish, shape, or texture. This texturing can be accomplished by intentionally providing one or more surface features 15 on working surface 10 prior to spraying liquid natural rubber 7 on working surface 10, the shape and texture of surface features 15 being thereby incorporated into vacuum bag membrane 20 as membrane surface features 25. The location of membrane surface feature 25 on vacuum bag membrane 20 determines whether membrane surface feature 25 will subsequently come into direct contact with preform 31, mold flange 9, or a portion of mold surface 3 when vacuum bag membrane 20 is in its final intended position for use. One membrane surface 25 feature might transfer ad infinitum to a surface of a composite article formed on mold 1. Another membrane surface feature 25 might provide a useful purpose in conjunction with mold flange 9 as part of a bag seal 13. Still another membrane surface feature 25 might provide a useful purpose in conjunction with mold surface 3 such as the creation of conduits for moving various waste fluids around on mold surface 3.

Figure 8A:
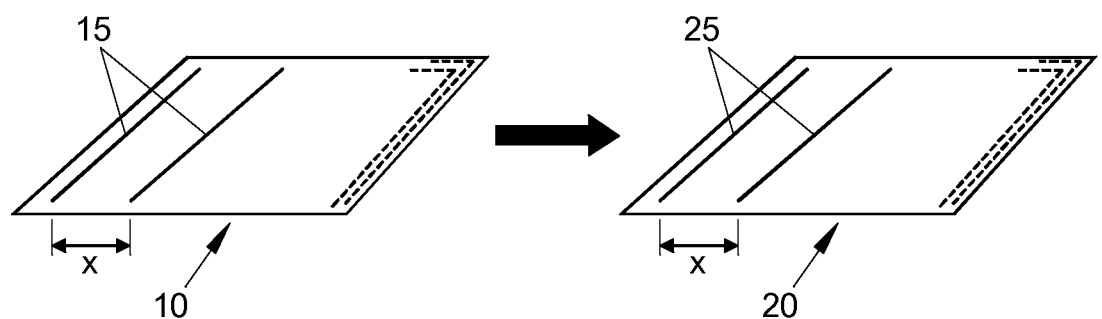
FIGS. 8a and 8b illustrate the incorporation of one or more surface features to measure bag deformation in a spray-formed vacuum bag according to an embodiment of the present subject matter.
Figure 8B:
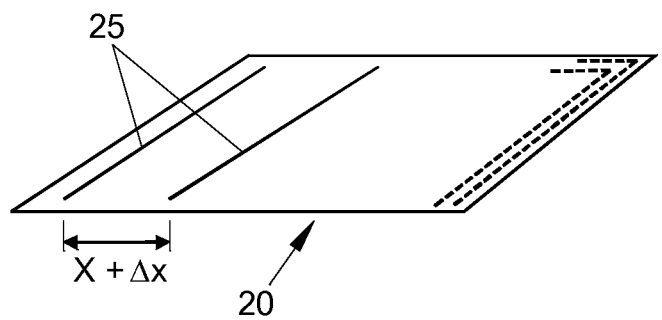

Examples of surface features 15 include a matte surface that facilitates secondary bonding, a textured surface that provides non-slip function or creates channels in the vacuum bag surface for fluid communication between points on the vacuum bag surface, a logo, an advertisement, a trademark or trade name, identifying features, and/or artistic designs. By way of specific example, FIG. 7 shows a logo resembling a tree being transferred from working surface 10 to a surface of vacuum bag membrane 20. By way of further example, surface features 15 can be a series of calibration lines shown in FIGS. 8a and 8b that provide reference points for measuring deformation in vacuum bag membrane 20 during its attachment to perimeter frame 22 or mold flange 9. Alternatively, as is depicted in FIG. 9, surface features 15 can be marks used for aligning multiple vacuum bag membranes 20 for forming a single large vacuum bag.

As noted above, vacuum bag membrane 20 constructed using this method can advantageously be used to compact a preform, such in the process of forming a structural article. For example, vacuum bag membrane 20 can be operable for forming molded products by Vacuum Assisted Resin Transfer Molding. Alternatively, the structural article formed can be a compressed stack of material, with vacuum bag membrane 20 being used for debulking or compaction of the material during processing and in preparation for shipment. Further, vacuum bag membrane 20 formed can be used in the common practice of pressing downward against the surface of preform 31 or uncompressed material stack (See FIG. 10), or vacuum bag membrane 20 can be an expandable bladder that can be inserted within a structure to provide pressure against internal surfaces of the structure. In addition, because of the combination of elasticity and toughness of natural rubber, the vacuum bag constructed by this method can be re-usable for forming plural structural articles.

In particular, a method for using a vacuum bag to compact a preform can begin with forming the vacuum bag. As such, the method can include providing a substantially non-porous working surface 10 having a desired shape of a vacuum bag, spraying at least one layer of a liquid natural rubber 7 over working surface 10, and solidifying the layers of liquid natural rubber 8 to form a vacuum bag membrane 20. (See FIGS. 1-4) As noted previously, providing a substantially non-porous working surface 10 can include placing a working surface template 2 on a base mold 1 and securing a substantially non-porous flexible film 12 over the working surface template 2, between which a buffer layer 11 can be placed.

Figure 10:
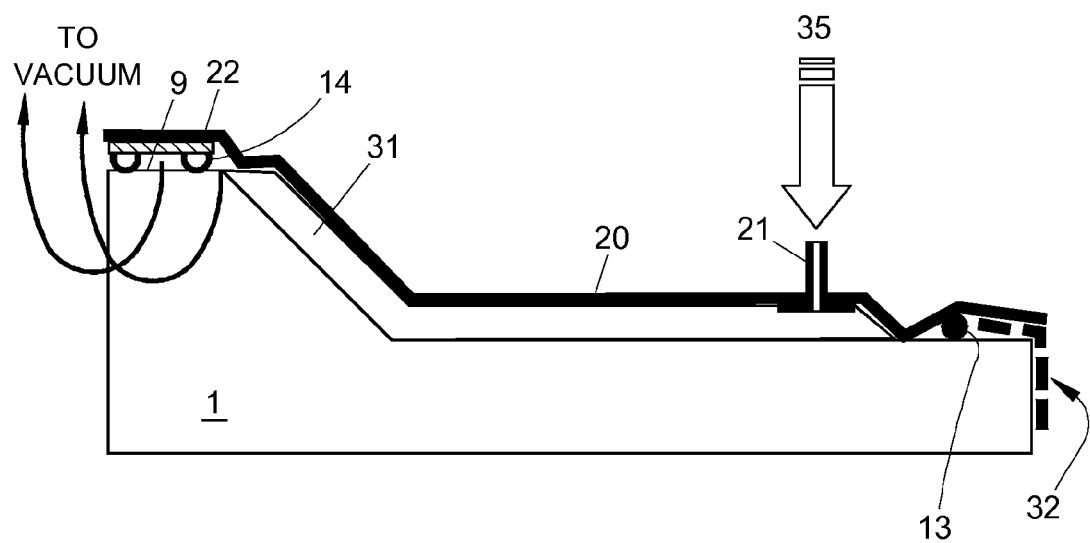
FIG. 10 illustrates an arrangement for making a structural article according to an embodiment of the present subject matter.

Referring to FIG. 10, to compact a preform using vacuum bag membrane 20, the method can further include providing a substantially non-deformable base surface, such as mold 1, having a desired shape of a structural article, positioning a preform 31 on base mold 1, and sealing preform 31 between base mold 1 and vacuum bag membrane 20. To facilitate the sealing of vacuum bag membrane 20 to base mold 1, base mold 1 can include a mold flange 9 extending beyond at least one perimeter edge of the desired shape of the structural article. Vacuum bag membrane 20 can likewise extend beyond the desired shape of the structural article and be secured at its periphery to mold flange 9 using seal 13 thus sealing preform 31 between base mold 1 and vacuum bag membrane 20.

The sealing can be performed by restraining the perimeter of the vacuum bag membrane 20 to base mold 1. As noted above, this restraint can be provided by incorporating an article 21, specifically a perimeter framework 22, into vacuum bag membrane 20 as liquid natural rubber 7 is sprayed over working surface 10. Perimeter framework 22 can then be clamped or otherwise secured using a bulb seal 14 for example to mold flange 9. Alternatively, one or more fasteners 32 can be secured to the perimeter of vacuum bag membrane 20 for fastening vacuum bag membrane 20 to base mold 1. For example, non-permanent fasteners such as loop-and-hook-type fasteners (e.g., Velcro) can be secured to the perimeter of vacuum bag membrane 20. Still another alternative is to provide a strip of expanded vinyl or polyurethane material that is inherently tacky, thereby creating a high coefficient of friction between vacuum bag membrane 20 and strip to hold vacuum bag membrane 20 in place.

Once preform 31 is sealed between base mold 1 and vacuum bag membrane 20, the method can further include removing air from between base mold 1 and vacuum bag membrane 20 to draw together base mold 1, preform 31, and vacuum bag membrane 20. In this way, preform 31 conforms substantially to mold surface 3, which defines the shape of the structural article. As discussed above, vacuum bag membrane 20 can elastically deform to compress preform 31 against the surface of base mold 1. In other embodiments, vacuum bag membrane 20 can be an expandable bladder that elastically deforms to expand within a structure.

For the manufacture of structural articles by debulking or compaction, the above-described method produces an article having a desired shape defined by the shape of base mold 1 and vacuum bag membrane 20. By following a similar procedure but then infusing preform 31 with a solidifiable resin 35 and solidifying resin 35, however, a composite article can be formed. Examples of composite articles that can be formed by this method include boat hulls, bridge decks, and wind blades, to name a few.

Stated otherwise, the method for making a composite article can include sealing a spray-formed natural rubber membrane 20 to a base mold 1 having a desired shape for making a composite article, evacuating air from a region defined by vacuum bag membrane 20 and a preform 31, flowing a solidifiable resin 35 in the region, and solidifying resin 35 to form the composite article. Further, because of the elasticity and toughness of natural rubber, this process can be repeated using the same spray-formed natural rubber vacuum bag membrane 20 to form plural composite articles.

In addition, as noted above, the method for forming a composite article can also include providing one or more surface features 15 on working surface 10 prior to spraying. The shape and texture of the surface features 15 is thus incorporated into the shape of vacuum bag membrane 20 as membrane surface features 25, and the shape and texture can then be transferred to the compacted preform or composite article. Examples of useful surface features 15 include a matte surface, a textured surface, a logo, an advertisement, a trademark or trade name, identifying features, artistic designs, calibration lines, and combinations thereof.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for forming a vacuum bag and using the vacuum bag for compacting a preform comprising:
   providing a substantially non-porous working surface having a desired shape of a vacuum bag;
   providing one or more design features on the working surface;
   spraying at least one layer of a natural rubber liquid over the substantially non-porous working surface;
   solidifying the at least one layer of natural rubber liquid to form a natural rubber membrane, the natural rubber membrane being elastically deformable, stretchable and substantially impermeable;
   wherein the shape and texture of the one or more design features is incorporated into the shape of the membrane;
   removing the natural rubber membrane from the substantially nonporous working surface for subsequent use of the natural rubber membrane;
   providing a substantially non-deformable base surface having a desired shape of a first surface of compacted preform;
   providing a preform on at least a portion of the base surface;
   sealing the preform between the base surface and the natural rubber membrane;
   removing air from between the base surface and the natural rubber membrane and drawing together the base surface, the preform, and the natural rubber membrane;
   deforming and stretching of the natural rubber membrane conforms the natural rubber membrane to one or more surface features of the preform, exerting a pressure upon the surface of the preform thereby imprinting the shape and texture of the design features onto the preform; and
   compacting the preform substantially to the desired shape of the compacted preform.

2. The method according to claim 1, further comprising:
   infusing the compacted preform with a solidifiable resin; and
   solidifying the solidifiable resin to create a composite article.

3. The method according to claim 2, wherein the composite article comprises a boat hull.

4. The method according to claim 1, wherein the one or more design features are selected from a group consisting of a matte surface, a textured surface, a logo, an advertisement, a trademark or trade name, identifying features, artistic designs, calibration lines, and combinations thereof.

5. The method according to claim 1, wherein providing a substantially non-porous working surface comprises:
   providing a substantially non-deformable base surface;
   placing a working surface template on the base surface;
   placing a porous buffer layer over the working surface template; and
   securing a substantially non-porous flexible film against the buffer layer to define the substantially non-porous working surface.

6. The method according to claim 5, wherein securing a substantially non-porous flexible film against the porous buffer layer comprises:
   sealing the perimeter of the flexible film to the base surface; and
   removing air from between the base surface and the flexible film until the flexible film is sufficiently secured over the working surface template.

7. The method according to claim 1, wherein the substantially non-deformable base surface includes a mold flange extending beyond at least one perimeter edge of the desired shape of the compacted preform; and
   wherein sealing the preform between the base surface and the natural rubber membrane comprises positioning the preform on the base surface and sealing the membrane to the base surface at the mold flange.

8. The method according to claim 1, wherein sealing comprises restraining the perimeter of the membrane to the base surface.

9. The method according to claim 8, wherein restraining the perimeter of the membrane to the base surface comprises securing one or more fasteners to the perimeter of the membrane and fastening the membrane to the base surface.

10. The method according to claim 1, further comprising placing one or more articles on the working surface prior to spraying, within the at least one layer of natural rubber liquid during spraying, or on the at least one layer of natural rubber liquid after spraying.

11. The method according to claim 10, wherein the one or more articles are selected from the group consisting of a perimeter framework, an internal framework, seals or portions of seals, attachments for lifting, ports, pressure intensifiers, pressure gauges, battens, thermocouples, sensors, actuators, RFID devices, heating elements, and combinations thereof.

12. The method according to claim 10, further comprising applying a primer to the one or more articles to facilitate bonding of the at least one layer of a natural rubber liquid to the one or more articles.

13. The method according to claim 10, wherein the one or more articles controls shrinkage in one or more portions of the membrane.

14. The method according to claim 1, wherein spraying at least one layer of a natural rubber liquid comprises at least partially atomizing the natural rubber liquid.

15. The method of claim 1, wherein the preform includes fibers, veils, flow media or cores, and combinations thereof.

\* \* \* \* \*